(12) United States Patent
Tanno et al.

(10) Patent No.: US 8,971,897 B2
(45) Date of Patent: Mar. 3, 2015

(54) CENTRALIZED CONTROL USING DIFFERENT BASE STATIONS FOR UPLINK AND DOWNLINK MOBILE COMMUNICATIONS

(75) Inventors: Motohiro Tanno, Yokohama (JP); Mamoru Sawahashi, Yokohama (JP); Yoshihisa Kishiyama, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 973 days.

(21) Appl. No.: 13/000,304

(22) PCT Filed: Jun. 22, 2009

(86) PCT No.: PCT/JP2009/061339
§ 371 (c)(1),
(2), (4) Date: Apr. 12, 2011

(87) PCT Pub. No.: WO2009/157412
PCT Pub. Date: Dec. 30, 2009

(65) Prior Publication Data
US 2011/0183705 A1 Jul. 28, 2011

(30) Foreign Application Priority Data
Jun. 23, 2008 (JP) .................................. 2008-163847

(51) Int. Cl.
*H04W 36/18* (2009.01)
*H04W 72/08* (2009.01)
*H04W 36/30* (2009.01)

(52) U.S. Cl.
CPC .............. *H04W 36/18* (2013.01); *H04W 36/30* (2013.01); *H04W 72/085* (2013.01)
USPC ........................................................ 455/442

(58) Field of Classification Search
None
See application file for complete search history.

(56) References Cited

U.S. PATENT DOCUMENTS

| 8,135,026 B2* | 3/2012 | Khandekar | 370/431 |
| 8,351,977 B2* | 1/2013 | Lee et al. | 455/524 |

(Continued)

FOREIGN PATENT DOCUMENTS

| JP | 2000-197092 A | 7/2000 |
| WO | 2009/044458 A1 | 4/2009 |

OTHER PUBLICATIONS

Patent Abstracts of Japan, Publication No. 2000-197092, dated Jul. 14, 2000, 1 page.
3GPP2 C.S0084-001-0, V2.0, Aug. 2007, "Physical Layer for Ultra Mobile Broadband (UMB) Air Interface Specification," 262 pages.
International Search Report issued in PCT/JP2009/061339, mailed on Aug. 25, 2009, with translation, 7 pages.

(Continued)

*Primary Examiner* — Philip Sobutka
(74) *Attorney, Agent, or Firm* — Osha Liang LLP (57) ABSTRACT

A centralized-control base station connected to a first transceiving unit and a second transceiving unit includes a first signal quality obtaining unit configured to obtain both uplink signal quality from a mobile station to the first transceiving unit and downlink signal quality from the first transceiving unit to the mobile station; a second signal quality obtaining unit configured to obtain both uplink signal quality from the mobile station to the second transceiving unit and downlink signal quality from the second transceiving unit to the mobile station; and a control unit configured to allow downlink data to be transmitted from the first transceiving unit, downlink feedback information to be received by the second transceiving unit, uplink data to be received by the second transceiving unit, and uplink feedback information to be transmitted from the first transceiving unit, when the downlink signal quality from the first transceiving unit to the mobile station is better than the downlink signal quality from the second transceiving unit to the mobile station and the uplink signal quality from the mobile station to the second transceiving unit is better than the uplink signal quality from the mobile station to the first transceiving unit.

5 Claims, 8 Drawing Sheets

(56) References Cited

U.S. PATENT DOCUMENTS

| | | | |
|---|---|---|---|
| 8,483,184 B2* | 7/2013 | Yokoyama et al. | 370/332 |
| 2003/0054812 A1* | 3/2003 | Hunzinger | 455/423 |
| 2007/0161389 A1 | 7/2007 | Khandekar | |
| 2010/0172329 A1 | 7/2010 | Yokoyama et al. | |

OTHER PUBLICATIONS

Extended European Search Report mailed May 16, 2014, in corresponding European Application No. 09770122.1 (6 pages).

* cited by examiner

FIG.2

(A) BS1 IS SELECTED (B) BS2 IS SELECTED

CENTRALIZED CONTROL USING DIFFERENT BASE STATIONS FOR UPLINK AND DOWNLINK MOBILE COMMUNICATIONS

TECHNICAL FIELD

The present invention relates to a centralized-control base station and a signal control method.

BACKGROUND ART

A service area in a mobile communication system is composed of cells, each of which is covered by a base station. Cells are classified into a macro cell, a micro cell, and a pico cell according to the size of the cell. Typically, the macro cell has a large coverage, where transmission power of a base station is high. On the other hand, the pico cell has a small coverage, where transmission power of a base station is low. For example, micro cells and pico cells are installed in sites where traffic flows heavily.

Figure 1:
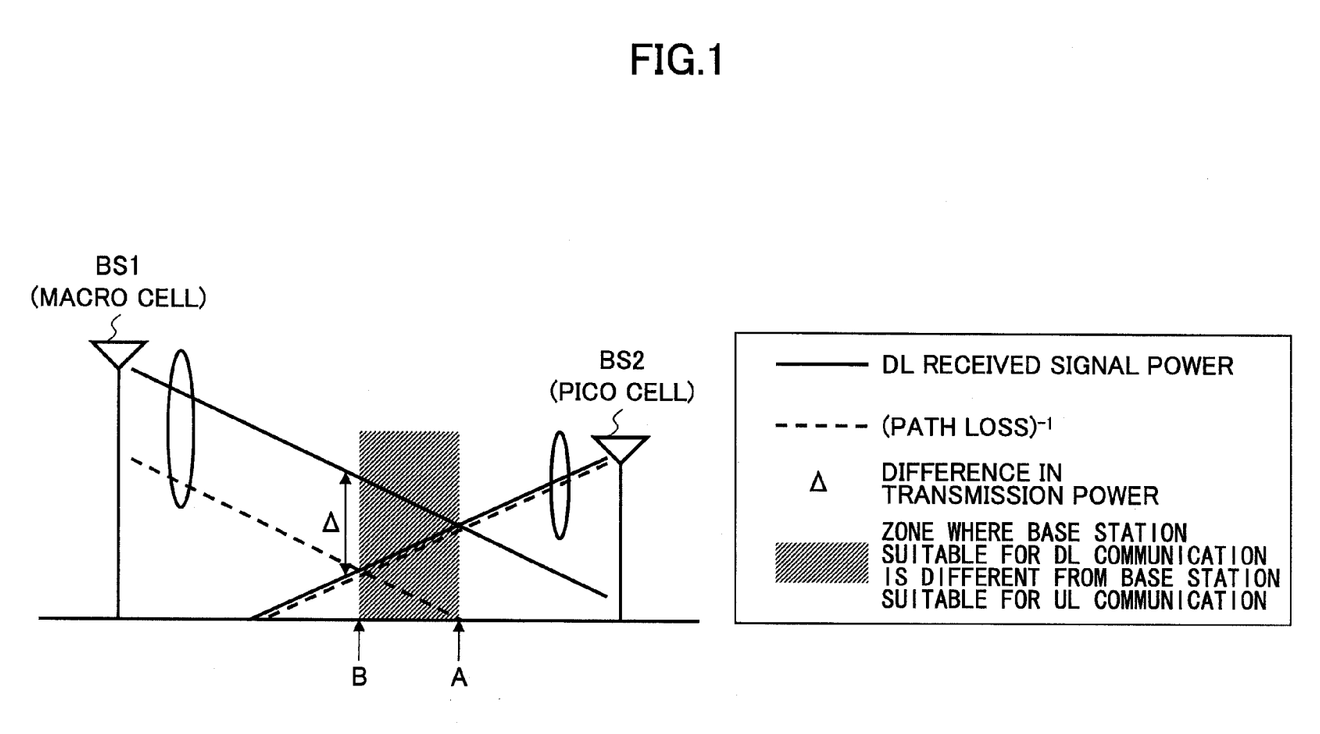
FIG. 1 shows a propagation environment in which two different base stations have different transmission power.

FIG. 1 shows a propagation environment in which two base stations BS1 and BS2 have different transmission power. Downlink transmission power from the base station BS1 to a mobile station decreases according to the distance between the base station BS1 and the mobile station. Similarly, downlink transmission power from the base station BS2 to the mobile station decreases according to the distance between the base station BS2 and the mobile station. At the point A in FIG. 1, downlink transmission power from the base station BS1 is equal to downlink transmission power from the base station BS2. Between the point of the base station BS1 and the point A, downlink transmission power from the base station BS1 is higher, and thus the base station BS1 is suitable for downlink communications. Between the point of the base station BS2 and the point A, downlink transmission power from the base station BS2 is higher, and thus the base station BS2 is suitable for downlink communications. Typically, transmission power of the base station BS1 providing the macro cell is higher than transmission power of the base station BS2 providing the pico cell, the distance between the base station BS1 and the point A is longer than the distance between the base station BS2 and the point A.

On the other hand, pass loss increases according to the distance from the base station. In other words, the inverse of path loss decreases according to the distance from the base station. At the point B in FIG. 1, the inverse of path loss associated with the base station BS1 is equal to the inverse of path loss associated with the base station BS2. Uplink signal quality from the mobile station to the base station depends on the inverse of path loss. Thus, between the point of the base station BS1 and the point B, uplink signal quality to the base station BS1 is higher, and thus the base station BS1 is suitable for uplink communications. Between the point of the base station BS2 and the point B, uplink signal quality to the base station BS2 is higher, and thus the base station BS2 is suitable for uplink communications. Since path loss depends on the distance from the base station, the point B is approximately at the midpoint between the base station BS1 and the base station BS2.

DISCLOSURE OF INVENTION

Problem(s) to be Solved by the Invention

Figure 2:
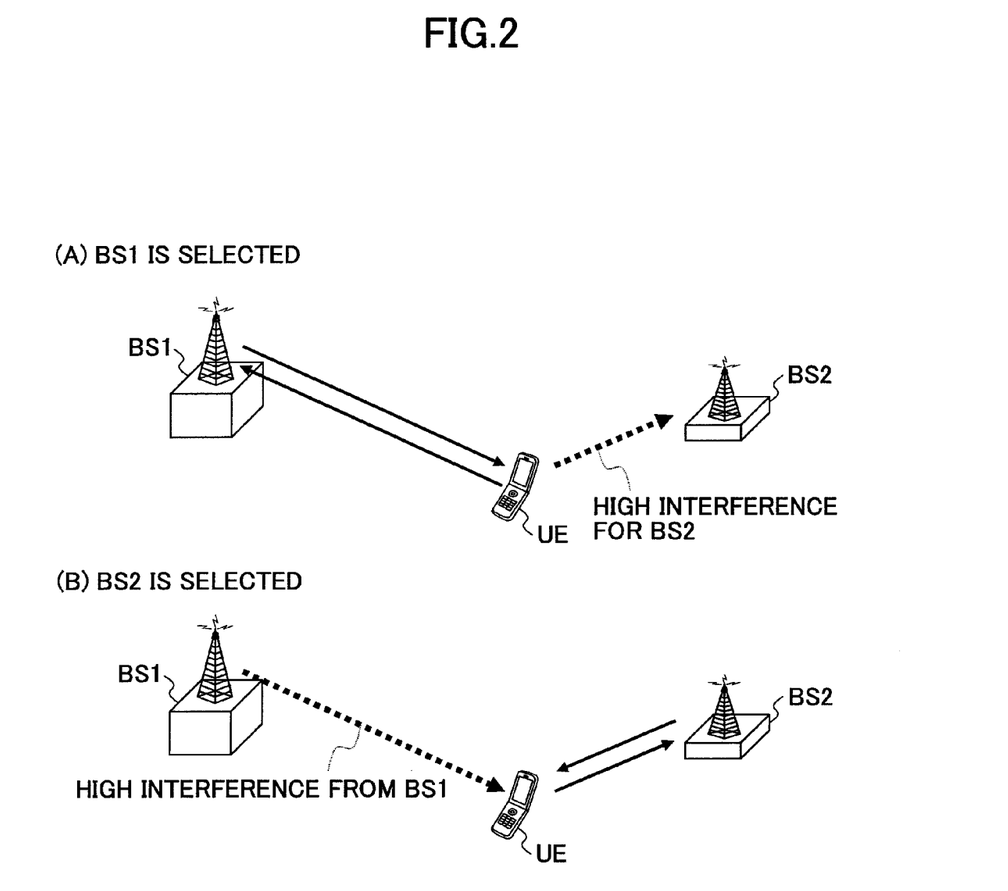
FIG. 2 shows a problem when two different base stations have different transmission power.

In a conventional mobile communication system, even though there is a zone (shaded area in FIG. 1) where the base station suitable for downlink communications is different from the base station suitable for uplink communications as described above, the same base station is selected for both downlink communications and uplink communications. For example, the base station BS1 is selected for both downlink communications and uplink communications, as shown in FIG. 2(A). Alternatively, the base station BS2 is selected for both downlink communications and uplink communications, as shown in FIG. 2(B). However, as shown in FIG. 2(A), when the mobile station UE communicates with the base station BS1 while the mobile station UE is situated within the shaded area in FIG. 1, uplink communications from the mobile station UE to the base station BS1 may cause high interference for the base station BS2. Also, as shown in FIG. 2(B), when the mobile station UE communicates with the base station BS2 while the mobile station UE is situated within the shaded area in FIG. 1, the mobile station UE may experience high interference from the base station BS1.

When the same base station is selected for both downlink communications and uplink communications, either downlink signal quality or uplink signal quality may be degraded. In addition, interference may become higher and the system capacity may become smaller, and thus radio resources may be wasted.

Figure 3:
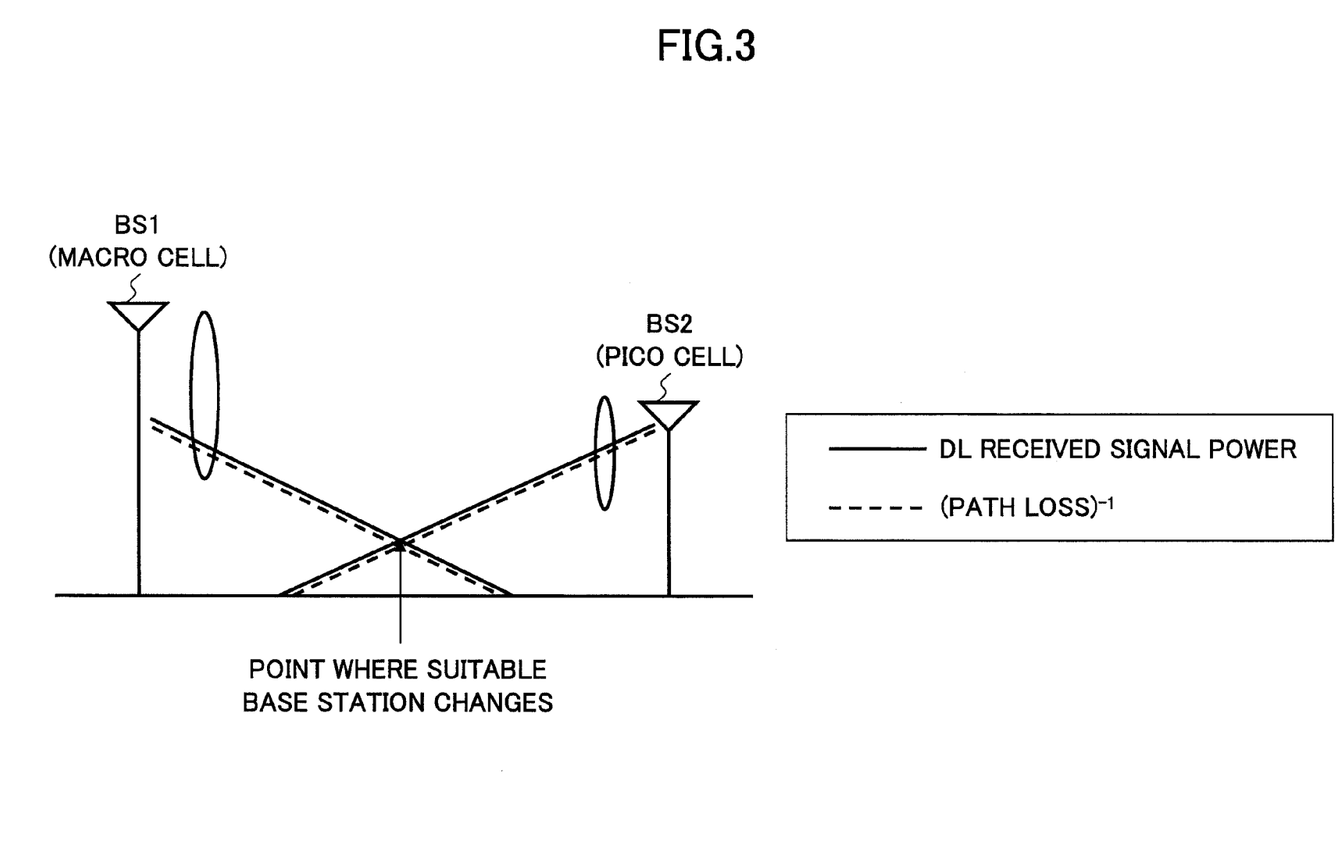
FIG. 3 shows a first possible solution to the problem when two different base stations have different transmission power.

In order to address this problem, as shown in FIG. 3, it is possible to reduce transmission power of the base station BS1 providing the macro cell (reduce transmission power of the base station BS1 to transmission power of the base station BS2 providing the pico cell) to cancel the shaded area in FIG. 1. When transmission power of the base station BS1 providing the macro cell is reduced, the point A in FIG. 1 moves closer to the base station BS1, and consequently the base station suitable for downlink communications can also be suitable for uplink communications. However, since transmission power of the base station BS1 is reduced, downlink signal quality from the base station BS1 to the mobile station is degraded and the coverage of the base station BS1 becomes smaller.

Figure 4:
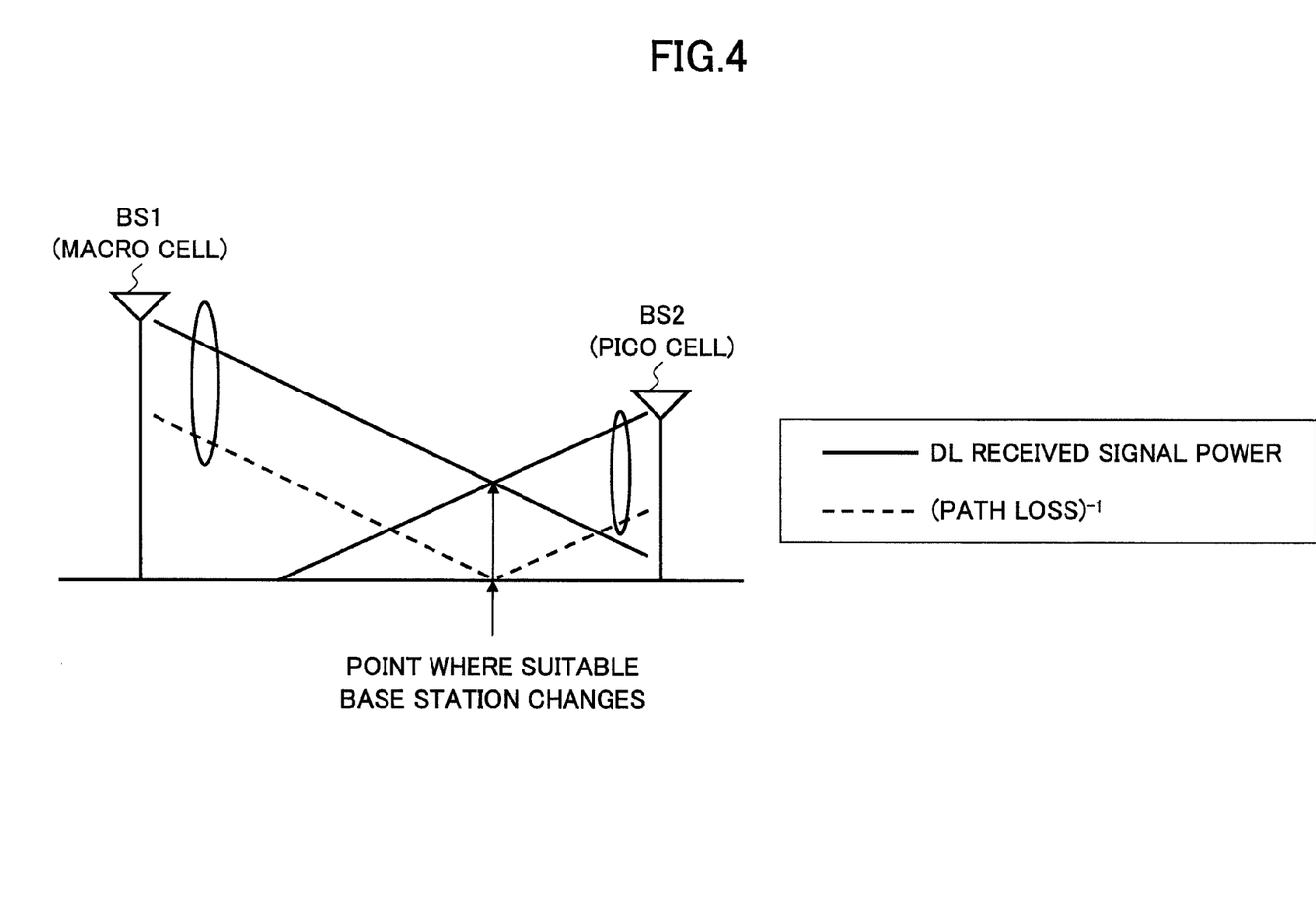
FIG. 4 shows a second possible solution to the problem when two different base stations have different transmission power.

Alternatively, as shown in FIG. 4, it is possible to lower the sensitivity in receiving uplink signals in the base station BS2 providing the pico cell to cancel the shaded area in FIG. 1. When the sensitivity in receiving uplink signals in the base station BS2 is lowered, the point B in FIG. 1 moves closer to the base station BS2, and consequently the base station suitable for downlink communications can also be suitable for uplink communications. However, since the sensitivity of reception in the base station BS2 is lowered, uplink signal quality from the mobile station to the base station BS2 is degraded and the coverage of the base station BS2 becomes smaller.

Figure 5:
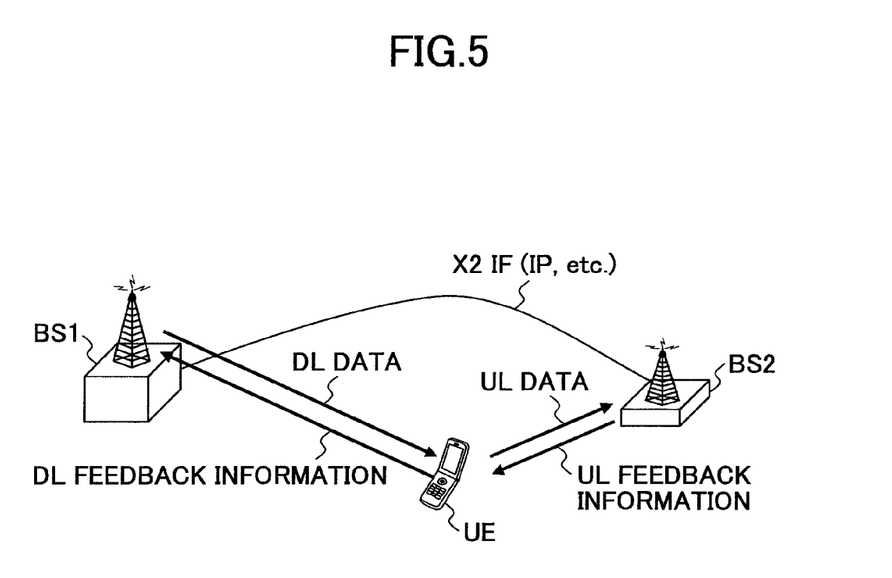
FIG. 5 shows a third possible solution to the problem when two different base stations have different transmission power.

Alternatively, as shown in FIG. 5, when the mobile station UE is situated within the shaded area in FIG. 1, it is possible to select different base stations for downlink data transmissions and uplink data transmissions (see 3GPP2, C.S0084-001-0, "Physical layer for Ultra Mobile Broadband (UMB) air interface specification," August 2007). Specifically, the mobile station UE receives downlink data from the base station BS1 and transmits uplink data to the base station BS2. In this manner, suitable base stations are selected for transmitting and receiving data. However, feedback information (ACK (Acknowledgement), CQI (Channel Quality Indicator), etc.) for downlink data needs to be transmitted from the mobile station UE to the base station BS1. Similarly, feedback information (ACK, etc.) for uplink data needs to be transmitted from the base station BS2 to the mobile station UE. While suitable base stations are selected for transmitting and receiving data, according to this solution, suitable base stations are not selected for transmitting and receiving feedback information. For this reason, when the mobile station UE transmits feedback information to the base station BS1, the transmission of the feedback information may cause high interference for the base station BS2. Also, when the mobile station UE receives feedback information from the base station BS2, the mobile station UE may experience high interference from the base station BS1.

In order to solve these problems, it is a general object of the present invention to improve uplink and downlink signal quality, when there is a zone where a base station suitable for downlink communications is different from a base station suitable for uplink communications.

Means for Solving the Problem(s)

In one aspect of the present invention, there is provided a centralized-control base station connected to a first transceiving unit and a second transceiving unit, including:

a first signal quality obtaining unit configured to obtain both uplink signal quality from a mobile station to the first transceiving unit and downlink signal quality from the first transceiving unit to the mobile station;

a second signal quality obtaining unit configured to obtain both uplink signal quality from the mobile station to the second transceiving unit and downlink signal quality from the second transceiving unit to the mobile station; and a control unit configured to allow downlink data to be transmitted from the first transceiving unit, downlink feedback information to be received by the second transceiving unit, uplink data to be received by the second transceiving unit, and uplink feedback information to be transmitted from the first transceiving unit, when the downlink signal quality from the first transceiving unit to the mobile station is better than the downlink signal quality from the second transceiving unit to the mobile station and the uplink signal quality from the mobile station to the second transceiving unit is better than the uplink signal quality from the mobile station to the first transceiving unit.

In another aspect of the present invention, there is provided a signal control method in a centralized-control base station connected to a first transceiving unit and a second transceiving unit, including the steps of:

obtaining both uplink signal quality from a mobile station to the first transceiving unit and downlink signal quality from the first transceiving unit to the mobile station;

obtaining both uplink signal quality from the mobile station to the second transceiving unit and downlink signal quality from the second transceiving unit to the mobile station; and allowing downlink data to be transmitted from the first transceiving unit, downlink feedback information to be received by the second transceiving unit, uplink data to be received by the second transceiving unit, and uplink feedback information to be transmitted from the first transceiving unit, when the downlink signal quality from the first transceiving unit to the mobile station is better than the downlink signal quality from the second transceiving unit to the mobile station and the uplink signal quality from the mobile station to the second transceiving unit is better than the uplink signal quality from the mobile station to the first transceiving unit.

Advantageous Effect of the Invention

According to an embodiment of the present invention, uplink and downlink signal quality can be improved.

DETAILED DESCRIPTION OF THE PREFERRED EMBODIMENTS

With reference to the accompanying drawings, a description is given below with regard to embodiments of the present invention.

Figure 6:
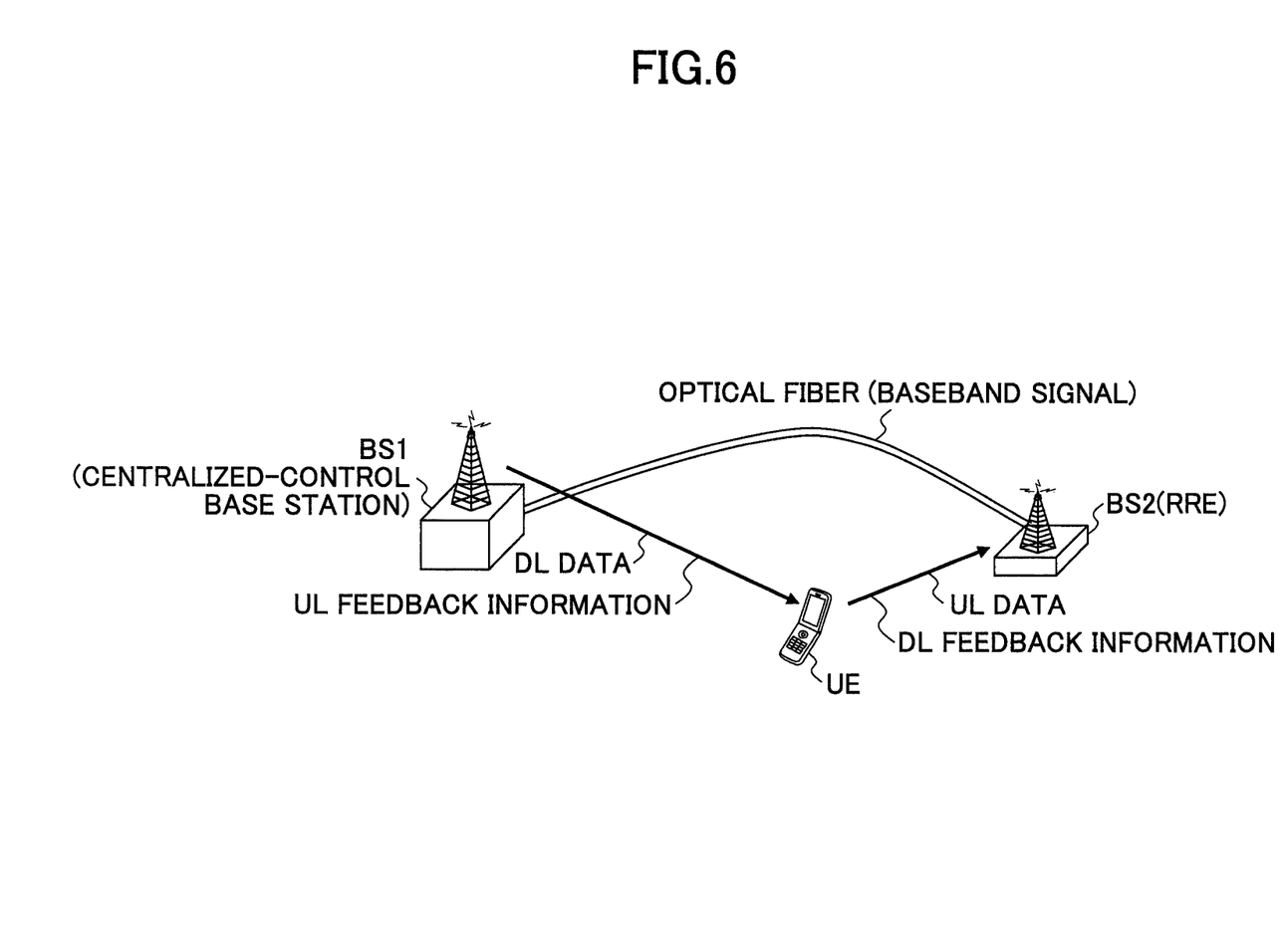
FIG. 6 shows a conceptual diagram of a mobile communication system according to an embodiment of the present invention.

In an embodiment of the present invention, a mobile communication system including a centralized-control base station (master base station) and an remote base station (also referred to as an RRE: Remote Radio Equipment) having different transmission power is used as an example where a base station suitable for downlink communications is different from a base station suitable for uplink communications. The centralized-control base station is a base station that is capable of processing baseband signals. The remote base station is a base station that is capable of A/D (analog-to-digital) conversion and D/A (digital-to-analog) conversion, but requests the centralized-control base station to process baseband signals. More specifically, the remote base station includes an RF (radio frequency) unit, an A/D conversion unit, and a D/A conversion unit. An interface between base stations is typically referred to as an X2 interface, where communications are performed according to IP (Internet Protocol) or the like. On the other hand, the remote base station is connected to the centralized-control base station via an optical fiber or the like, where communications are performed using baseband signals. The remote base station may be also referred to as a slave base station. FIG. 6 shows a conceptual diagram of a mobile communication system according to this embodiment.

In the embodiment of the present invention, when a mobile station UE is situated within the shaded area in FIG. 1, the mobile station UE selects different base stations for downlink communications and uplink communications. Specifically, the mobile station UE receives downlink data from the centralized-control base station BS1 and transmits uplink data to the remote base station BS2. In addition, the mobile station UE receives feedback information for the uplink data from the centralized-control base station BS1. The mobile station UE also transmits feedback information for the downlink data via the remote base station BS2 to the centralized-control base station BS1. According to this embodiment, suitable base stations are selected for transmitting and receiving data as well as for transmitting and receiving feedback information. Since baseband signals are transmitted between the centralized-control base station BS1 and the remote base station BS2 and processed by the centralized-control base station BS1, fast feedback control can be implemented.

<Configuration of a Mobile Communication System>

Figure 7:
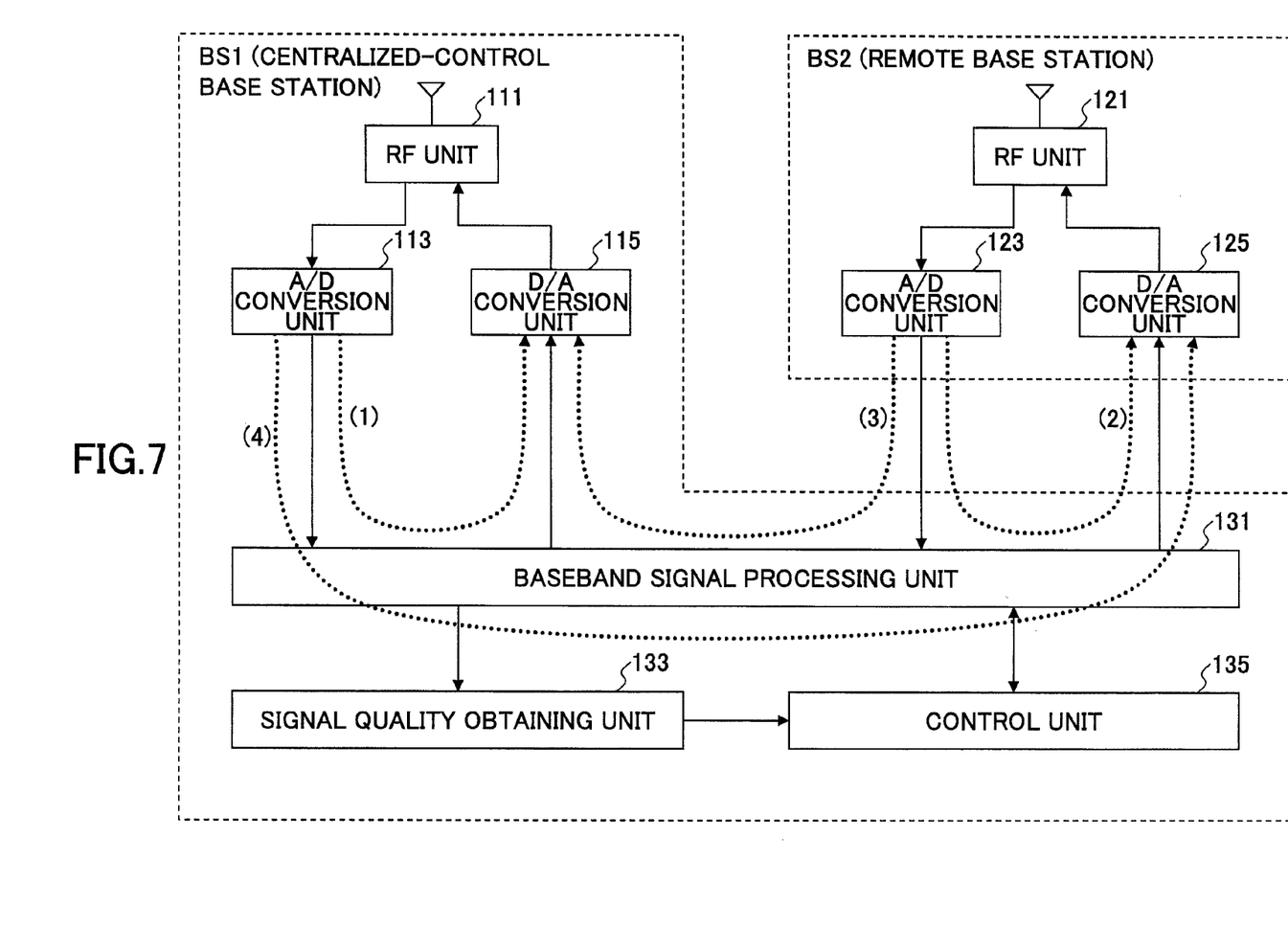
FIG. 7 shows a block diagram of a base station according to an embodiment of the present invention.

With reference to FIG. 7, a configuration of a mobile communication system according to an embodiment of the present invention is described below. The mobile communication system according to the embodiment of the present invention includes a centralized-control base station BS1 and a remote base station BS2.

The centralized-control base station BS1 includes an RF unit 111, an A/D conversion unit 113, a D/A conversion unit 115, a baseband signal processing unit 131, a signal quality obtaining unit 133, and a control unit 135. The remote base station BS2 includes an RF unit 121, an A/D conversion unit 123, and a D/A conversion unit 125. The RF unit, the A/D conversion unit, and the D/A conversion unit are collectively referred to as a transceiving unit.

The RF unit 111 performs analog signal processing such as band filtering, frequency conversion, and power amplification. The A/D conversion unit 113 converts analog signals received by the RF unit 111 into digital signals to generate baseband signals. The D/A conversion unit 115 converts baseband signals into analog signals and supplies the analog signals to the RF unit 111. The A/D conversion unit 113 and the D/A conversion unit 115 are connected to the baseband signal processing unit 131.

Similarly, the RF unit 121 performs analog signal processing such as band filtering, frequency conversion, and power amplification. The A/D conversion unit 123 converts analog signals received by the RF unit 121 into digital signals to generate baseband signals. The D/A conversion unit 125 converts baseband signals into analog signals and supplies the analog signals to the RF unit 121. The A/D conversion unit 123 and the D/A conversion unit 125 are connected to the baseband signal processing unit 131 via a high-speed transmission path such as an optical fiber.

The baseband signal processing unit 131 performs layer-1 processing, MAC (media access control) processing, RLC/PDCP (radio link control/packet data convergence protocol) processing, or the like of baseband signals. Specifically, the baseband signal processing unit 131 receives the baseband signals from the A/D conversion units 113 and 123, and then performs layer-1 processing such as channel decoding and FFT (fast Fourier transform). The baseband signal processing unit 131 also performs MAC processing such as MAC retransmission control, scheduling, and transmission format selection of uplink data. The baseband signal processing unit 131 also performs PLC/PDCP processing such as segmentation and concatenation of uplink data. The baseband signal processing unit 131 also performs PLC/PDCP processing such as segmentation and concatenation of downlink data. The baseband signal processing unit 131 also performs MAC processing such as MAC retransmission control, scheduling, and transmission format selection of downlink data. The baseband signal processing unit 131 also performs layer-1 processing such as channel coding and IFFT (inverse fast Fourier transform), and then supplies baseband signals to the D/A conversion units 115 and 125.

The signal quality obtaining unit 133 obtains both uplink signal quality from the mobile station UE to the centralized-control base station BS1 and downlink signal quality from the centralized-control base station BS1 to the mobile station UE. For example, the uplink signal quality is obtained by measurement of received level (for example, SINR: signal-to-noise pulse interference ratio) of a predetermined signal sequence received from the mobile station UE. For example, the downlink signal quality is obtained by reception of CQI measured by the mobile station UE. Similarly, the signal quality obtaining unit 133 obtains both uplink signal quality from the mobile station UE to the remote base station BS2 and downlink signal quality from the remote base station BS2 to the mobile station UE.

The control unit 135 selects a base station suitable for downlink communications and a base station suitable for uplink communications based on the signal quality obtained by the signal quality obtaining unit 133. As described with reference to FIG. 1, there may be a zone where the base station suitable for downlink communications is different from the base station suitable for uplink communications. Thus, the base station suitable for downlink communications may be different from the base station suitable for uplink communications. For example, when downlink signal quality from the centralized-control base station BS1 to the mobile station UE is better than downlink signal quality from the remote base station BS2 to the mobile station UE, the control unit 135 selects the centralized-control base station BS1 as the base station suitable for downlink communications. In this case, downlink data to the user equipment terminal UE and feedback information for uplink data from the user equipment terminal UE are transmitted from the transceiving unit in the centralized-control base station BS1 to the mobile station UE.

For example, when uplink signal quality from the mobile station UE to the remote base station BS2 is better than uplink signal quality from the mobile station UE to the centralized-control base station BS1, the control unit 135 selects the remote base station BS2 as the base station suitable for uplink communications. In this case, uplink data from the user equipment terminal UE and feedback information for downlink data to the user equipment terminal UE are transmitted from the mobile station UE to the remote base station BS2. Similarly, when downlink signal quality from the remote base station BS2 to the mobile station UE is better than downlink signal quality from the centralized-control base station BS1 to the mobile station UE, or when uplink signal quality from the mobile station UE to the centralized-control base station BS1 is better than uplink signal quality from the mobile station UE to the remote base station BS2, base stations suitable for downlink communications and uplink communications are selected. Information about the selected base stations with which the mobile station UE communicates is transmitted from the transceiving unit of the base station in communication with the mobile station UE to the mobile station UE.

In addition, the control unit 135 controls signal flow between the mobile station UE and the base stations suitable for downlink communications and uplink communications. Based on whether the base stations suitable for downlink communications and uplink communications are the centralized-control base station BS1 and/or remote base station BS2, the control unit 135 controls the following signal flows (1)-(4).

(1) When the centralized-control base station BS1 is suitable for both downlink communications and uplink communications, the control unit 135 allows downlink data to be supplied to the D/A conversion unit 115 in the centralized-control base station BS1, and allows downlink feedback information to be received from the A/D conversion unit 113 in the centralized-control base station BS1. In addition, the control unit 135 allows uplink data to be received from the A/D conversion unit 113 in the centralized-control base station BS1, and allows uplink feedback information to be supplied to the D/A conversion unit 115 in the centralized-control base station BS1.

(2) When the remote base station BS2 is suitable for both downlink communications and uplink communications, the control unit 135 allows downlink data to be supplied to the D/A conversion unit 125 in the remote base station BS2, and allows downlink feedback information to be received from the A/D conversion unit 123 in the remote base station BS2. In addition, the control unit 135 allows uplink data to be received from the A/D conversion unit 123 in the remote base station BS2, and allows uplink feedback information to be supplied to the D/A conversion unit 125 in the remote base station BS2.

(3) When the centralized-control base station BS1 is suitable for downlink communications and the remote base station BS2 is suitable for uplink communications, the control unit 135 allows downlink data to be supplied to the D/A conversion unit 115 in the centralized-control base station BS1, and allows downlink feedback information to be received from the A/D conversion unit 123 in the remote base station BS2. In addition, the control unit 135 allows uplink data to be received from the A/D conversion unit 123 in the remote base station BS2, and allows uplink feedback information to be supplied to the D/A conversion unit 115 in the centralized-control base station BS1.

(4) When the remote base station BS2 is suitable for downlink communications and the centralized-control base station BS1 is suitable for uplink communications, the control unit 135 allows downlink data to be supplied to the D/A conversion unit 125 in the remote base station BS2, and allows downlink feedback information to be received from the A/D conversion unit 113 in the centralized-control base station BS1. In addition, the control unit 135 allows uplink data to be received from the A/D conversion unit 113 in the centralized-control base station BS1, and allows uplink feedback information to be supplied to the D/A conversion unit 125 in the remote base station BS2.

Typically, since transmission power of the centralized-control base station BS1 is higher than transmission power of the remote base station BS2, the control unit 135 controls the signal flow (3) within the shaded area in FIG. 1. However, transmission power of the remote base station BS2 may be higher than transmission power of the centralized-control base station BS1. In this case, the control unit 135 controls the signal flow (4) within the shaded area in FIG. 1.

In addition, the control unit 135 may combine signals received by the RF unit 111 in the centralized-control base station BS1 and signals received by the RF unit 121 in the remote base station BS2 to generate feedback information. In this case, while uplink communications are performed with both of the base stations BS1 and BS2, feedback control (for example, transmission power control, AMC (adaptive modulation and coding), and/or scheduling) is performed based on quality of the combined signals. As a result, it is possible to perform feedback control in such a manner that the mobile station UE substantially communicates with either of the base stations. For example, with transmission power control suitable for reception from the remote base station BS2, the control unit 135 allows the mobile station UE to substantially perform uplink communications suitable for the remote base station BS2.

For example, in the case of the signal flow (1), the control unit 135 may also receive uplink signals (uplink control information, uplink data, and feedback information for downlink data) from the A/D conversion unit 123 in the remote base station BS2 and combine uplink signals received by the centralized-control base station BS1 and the remote base station BS2. Then, the control unit 135 may generate feedback information based on the combined uplink signals.

For example, in the case of the signal flow (2), the control unit 135 may also receive uplink signals from the A/D conversion unit 113 in the centralized-control base station BS1 and combine uplink signals received by the centralized-control base station BS1 and the remote base station BS2. Then, the control unit 135 may generate feedback information based on the combined uplink signals.

For example, in the case of the signal flow (3), the control unit 135 may also receive uplink signals from the A/D conversion unit 113 in the centralized-control base station BS1 and combine uplink signals received by the centralized-control base station BS1 and the remote base station BS2. Then, the control unit 135 may generate feedback information based on the combined uplink signals.

For example, in the case of the signal flow (4), the control unit 135 may also receive uplink signals from the A/D conversion unit 123 in the remote base station BS2 and combine uplink signals received by the centralized-control base station BS1 and the remote base station BS2. Then, the control unit 135 may generate feedback information based on the combined uplink signals.

While the centralized-control base station BS1 shown in FIG. 7 includes the RF unit 111, the A/D conversion unit 113, and the D/A conversion unit 115, the centralized-control base station BS1 may not include these units. For example, the centralized-control base station BS1 may include the baseband signal processing unit 131, the signal quality obtaining unit 133, and the control unit 135 and another remote base station may include the RF unit 111, the A/D conversion unit 113, and the D/A conversion unit 115. In this case, the centralized-control base station BS1 may control plural remote base stations (i.e., plural transceiving units).

<Signal Processing Method in a Centralized-Control Base Station>

Figure 8:
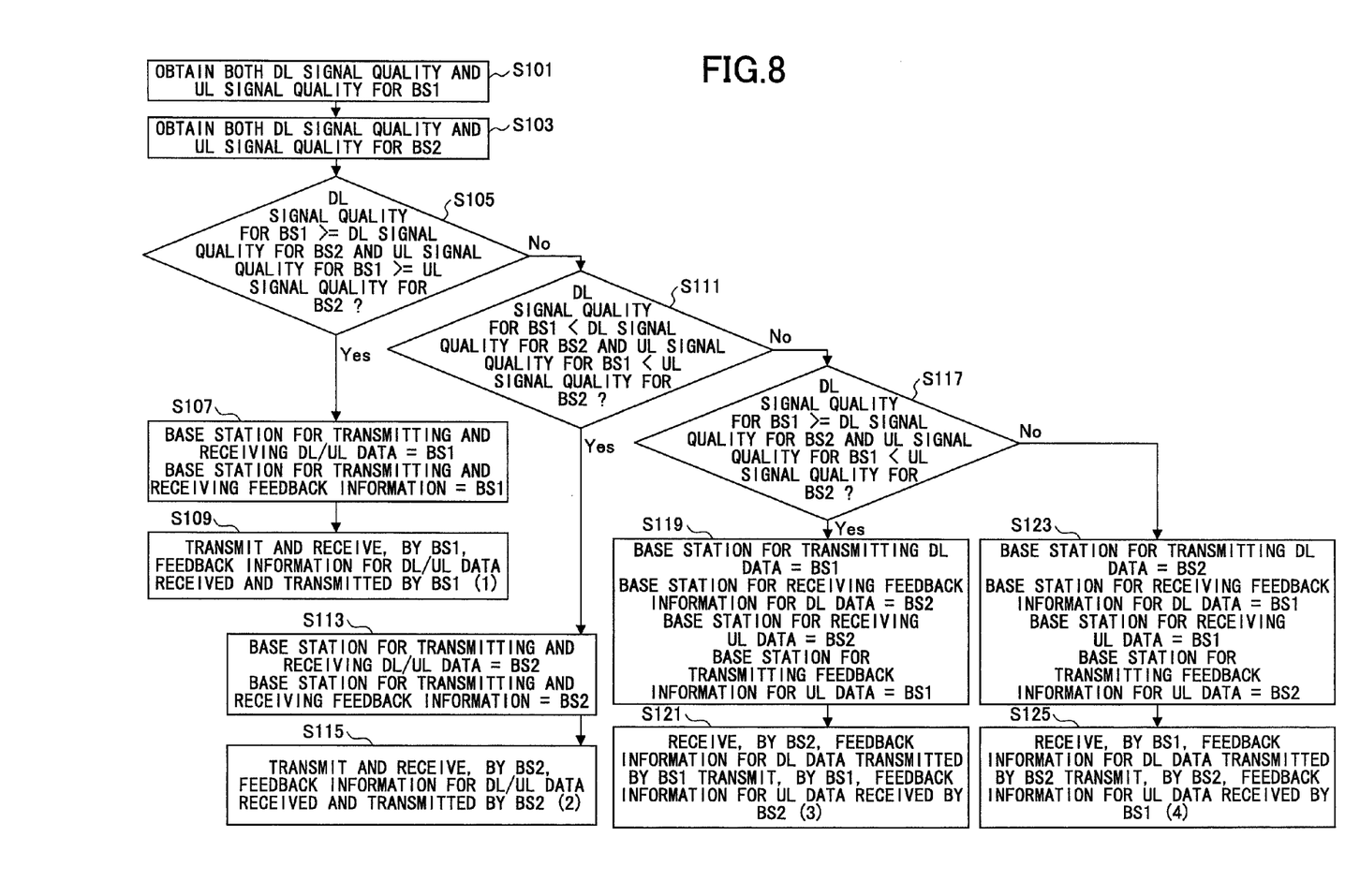
FIG. 8 shows a flowchart of a signal processing method in a centralized-control base station according to an embodiment of the present invention.

With reference to FIG. 8, a signal processing method in the centralized-control base station BS1 according to an embodiment of the present invention is described below.

First, the centralized-control base station BS1 obtains both uplink signal quality from the mobile station UE to the centralized-control base station BS1 and downlink signal quality from the centralized-control base station BS1 to the mobile station UE (S101). The centralized-control base station BS1 also obtains both uplink signal quality from the mobile station UE to the remote base station BS2 and downlink signal quality from the remote base station BS2 to the mobile station UE (S103).

When the downlink signal quality from the centralized-control base station BS1 to the mobile station UE is better than the downlink signal quality from the remote base station BS2 to the mobile station UE and the uplink signal quality from the mobile station UE to the centralized-control base station BS1 is better than the uplink signal quality from the mobile station UE to the remote base station BS2 (S105: YES), the centralized-control base station BS1 is selected as a base station suitable for both downlink communications and uplink communications (S107). Thus, the transceiving unit in the centralized-control base station BS1 transmits downlink data and receives uplink data, and transmits feedback information for uplink data and receives feedback information for downlink data (S109). This process in step S109 corresponds to the signal flow (1) in FIG. 7.

When the downlink signal quality from the remote base station BS2 to the mobile station UE is better than the downlink signal quality from the centralized-control base station BS1 to the mobile station UE and the uplink signal quality from the mobile station UE to the remote base station BS2 is better than the uplink signal quality from the mobile station UE to the centralized-control base station BS1 (S105: NO→S111: YES), the remote base station BS2 is selected as a base station suitable for both downlink communications and uplink communications (S113). Thus, the transceiving unit in the remote base station BS2 transmits downlink data and receives uplink data, and transmits feedback information for uplink data and receives feedback information for downlink data (S115). This process in step S115 corresponds to the signal flow (2) in FIG. 7.

When the downlink signal quality from the centralized-control base station BS1 to the mobile station UE is better than the downlink signal quality from the remote base station BS2 to the mobile station UE and the uplink signal quality from the mobile station UE to the remote base station BS2 is better than the uplink signal quality from the mobile station UE to the centralized-control base station BS1 (S111: NO→S117: YES), the centralized-control base station BS1 is selected as a base station suitable for downlink communications and the remote base station BS2 is selected as a base station suitable for uplink communications (S119). Thus, the transceiving unit in the centralized-control base station BS1 transmits downlink data and the transceiving unit in the remote base station BS2 receives feedback information for downlink data. In addition, the transceiving unit in the remote base station BS2 receives uplink data and the transceiving unit in the centralized-control base station BS1 transmits feedback information for uplink data (S121). This process in step S121 corresponds to the signal flow (3) in FIG. 7.

When the downlink signal quality from the remote base station BS2 to the mobile station UE is better than the downlink signal quality from the centralized-control base station BS1 to the mobile station UE and the uplink signal quality from the mobile station UE to the centralized-control base station BS1 is better than the uplink signal quality from the mobile station UE to the remote base station BS2 (S117: NO), the remote base station BS2 is selected as a base station suitable for downlink communications and the centralized-control base station BS1 is selected as a base station suitable for uplink communications (S123). Thus, the transceiving unit in the remote base station BS2 transmits downlink data and the transceiving unit in the centralized base station BS1 receives feedback information for downlink data. In addition, the transceiving unit in the centralized-control base station BS1 receives uplink data and the transceiving unit in the remote base station BS2 transmits feedback information for uplink data (S125). This process in step S125 corresponds to the signal flow (4) in FIG. 7.

Since suitable base stations are selected for both data and feedback information, according to the embodiment of the present invention, uplink and downlink signal quality can be improved. In addition, the system capacity can be improved.

In addition, since the centralized-control base station BS1 performs baseband signal processing for the remote base station BS2, according to the embodiment of the present invention, fast feedback control (for example, AMC (adaptive modulation and coding), HARQ (hybrid automatic repeat request), etc.) can be implemented, which is not feasible with the X2 interface connecting between base stations.

The present invention is not limited to the preferred embodiments thereof, so that various variations and changes are possible within the scope of the present invention. The embodiments of the present invention focus on the mobile communication system including the centralized-control base station and the remote base station as an example where a base station suitable for downlink communications is different from a base station suitable for uplink communications. However, even in a typical base station, transmission power at the end of one antenna may be different from transmission power at the end of another antenna due to cable loss or the like. As a result, there may be a zone where a base station suitable for downlink communications is different from a base station suitable for uplink communications. In this case, baseband signal processing may be integrated into one base station, and then different base stations may be selected for downlink communications and uplink communications to improve uplink and downlink signal quality.

In addition, there may be a zone where a base station suitable for downlink communications is different from a base station suitable for uplink communications, in the case where a downlink frequency band is different from an uplink frequency band, in the case where positions of antennas are different, in the case where different systems are used (for example, an IMT-A (International Mobile Telecommunications-Advanced) system is used for downlink communications and an LTE (Long Term Evolution) system is used for uplink communications), or the like. In these cases, baseband signal processing may be integrated into one base station, and then different base stations may be selected for downlink communications and uplink communications to improve uplink and downlink signal quality.

Furthermore, there may be a zone where a base station suitable for downlink communications is different from a base station suitable for uplink communications, when the cell of the same base station is composed of plural sectors and transmission power at the end of the antenna for one sector is different from transmission power at the end of the antenna for another sector. In this case, different sectors may be selected for downlink communications and uplink communications to improve uplink and downlink signal quality.

This international patent application is based on Japanese Priority Application No. 2008-163847 filed on Jun. 23, 2008, the entire contents of which are incorporated herein by reference.

DESCRIPTION OF NOTATIONS

111 RF unit
113 A/D conversion unit
115 D/A conversion unit
121 RF unit
123 A/D conversion unit
125 D/A conversion unit
131 baseband signal processing unit
133 signal quality obtaining unit
135 control unit

The invention claimed is:

1. A centralized-control base station connected to a first transceiving unit and a second transceiving unit, comprising:
a first signal quality obtaining unit configured to obtain both uplink signal quality from a mobile station to the first transceiving unit and downlink signal quality from the first transceiving unit to the mobile station;
a second signal quality obtaining unit configured to obtain both uplink signal quality from the mobile station to the second transceiving unit and downlink signal quality from the second transceiving unit to the mobile station; and
a control unit configured to allow downlink data to be transmitted from the first transceiving unit, downlink feedback information to be received by the second transceiving unit, uplink data to be received by the second transceiving unit, and uplink feedback information to be transmitted from the first transceiving unit, when the downlink signal quality from the first transceiving unit to the mobile station is better than the downlink signal quality from the second transceiving unit to the mobile station and the uplink signal quality from the mobile station to the second transceiving unit is better than the uplink signal quality from the mobile station to the first transceiving unit.

2. The centralized-control base station, as claimed in claim 1, wherein:

the control unit allows downlink data to be transmitted from the second transceiving unit, downlink feedback information to be received by the first transceiving unit, uplink data to be received by the first transceiving unit, and uplink feedback information to be transmitted from the second transceiving unit, when the downlink signal quality from the second transceiving unit to the mobile station is better than the downlink signal quality from the first transceiving unit to the mobile station and the uplink signal quality from the mobile station to the first transceiving unit is better than the uplink signal quality from the mobile station to the second transceiving unit.

3. The centralized-control base station, as claimed in claim 1, wherein:

the first transceiving unit is included in the centralized-control base station and the second transceiving unit is included in a remote base station, the centralized-control base station further comprising a baseband signal processing unit configured to process a baseband signal received from the remote base station and a baseband signal to be transmitted to the remote base station.

4. The centralized-control base station, as claimed in claim 1, wherein:

the control unit combines signals received by the first transceiving unit and the second transceiving unit and generates feedback information based on the combined signals.

5. A signal control method in a centralized-control base station connected to a first transceiving unit and a second transceiving unit, comprising the steps of:

obtaining both uplink signal quality from a mobile station to the first transceiving unit and downlink signal quality from the first transceiving unit to the mobile station;

obtaining both uplink signal quality from the mobile station to the second transceiving unit and downlink signal quality from the second transceiving unit to the mobile station; and allowing downlink data to be transmitted from the first transceiving unit, downlink feedback information to be received by the second transceiving unit, uplink data to be received by the second transceiving unit, and uplink feedback information to be transmitted from the first transceiving unit, when the downlink signal quality from the first transceiving unit to the mobile station is better than the downlink signal quality from the second transceiving unit to the mobile station and the uplink signal quality from the mobile station to the second transceiving unit is better than the uplink signal quality from the mobile station to the first transceiving unit.

* * * * *